(12) United States Patent
Samuel et al.

(10) Patent No.: US 12,034,822 B2
(45) Date of Patent: Jul. 9, 2024

(54) LOCATION-BASED DETERMINATIONS

(71) Applicant: Stripe, Inc., San Francisco, CA (US)

(72) Inventors: Noam Samuel, San Francisco, CA (US); Ellen Stanfill, San Francisco, CA (US); David C. Doran, Ashbourne (IE); Alexander Thiemann, San Francisco, CA (US)

(73) Assignee: STRIPE, INC., San Francisco, CA (US)

( * ) Notice: Subject to any disclaimer, the term of this patent is extended or adjusted under 35 U.S.C. 154(b) by 0 days.

(21) Appl. No.: 18/336,657

(22) Filed: Jun. 16, 2023

(65) Prior Publication Data

US 2023/0336635 A1 Oct. 19, 2023

Related U.S. Application Data

(63) Continuation of application No. 17/181,494, filed on Feb. 22, 2021, now Pat. No. 11,706,306.

(51) Int. Cl.
*G06Q 30/0601* (2023.01)
*G06Q 20/20* (2012.01)
*G06Q 30/04* (2012.01)
*H04L 67/52* (2022.01)

(52) U.S. Cl.
CPC ............. *H04L 67/52* (2022.05); *G06Q 30/04* (2013.01); *G06Q 30/0603* (2013.01)

(58) Field of Classification Search
CPC .... H04L 67/52; G06Q 30/04; G06Q 30/0603; G06Q 20/207; G06Q 40/02; G06Q 20/00; G06F 17/22; G07F 19/00
See application file for complete search history.

(56) References Cited

U.S. PATENT DOCUMENTS

| | | | | |
|---|---|---|---|---|
| 5,802,499 A | * | 9/1998 | Sampson | G06Q 40/02 705/35 |
| 7,860,746 B1 | * | 12/2010 | Fitch | G06Q 40/123 705/30 |
| 8,505,106 B1 | * | 8/2013 | Bhosle | H04L 9/3213 726/28 |
| 9,392,125 B1 | * | 7/2016 | Besson | H04W 4/16 |
| 9,824,354 B1 | * | 11/2017 | Collison | G06Q 20/38215 |
| 10,134,036 B1 | * | 11/2018 | Collison | G06Q 20/38215 |
| 11,080,724 B1 | * | 8/2021 | Arnott | H04W 4/021 |

(Continued)

OTHER PUBLICATIONS

Notice of Allowance on U.S. Appl. No. 17/181,494 dated Mar. 7, 2023 (11 pages).

*Primary Examiner* — Chris Parry
*Assistant Examiner* — Hassan A Khan
(74) *Attorney, Agent, or Firm* — Foley & Lardner LLP

(57) ABSTRACT

A method for location-dependent determination comprises: determining, with one or more processors, a geographic location of a user's electronic device using first data; in response to determining the determined geographic location is insufficient for performing a location-dependent determination, requesting second data to determine an updated geographic location of the user's electronic device; performing, with an Application Programming Interface (API), the location-dependent determination based on the updated geographic location; and completing, with the API, a transaction using the location-dependent determination.

20 Claims, 8 Drawing Sheets

(56) References Cited

U.S. PATENT DOCUMENTS

| | | | | |
|---|---|---|---|---|
| 11,514,423 B1* | 11/2022 | Kurani | | G06F 3/04817 |
| 11,552,845 B1* | 1/2023 | Hecht | | H04L 67/306 |
| 2002/0116302 A1* | 8/2002 | Wilmes | | G06Q 20/207 |
| | | | | 705/417 |
| 2003/0093320 A1* | 5/2003 | Sullivan | | G06Q 20/207 |
| | | | | 705/19 |
| 2004/0225520 A1* | 11/2004 | Aoki | | G06Q 20/4016 |
| | | | | 705/38 |
| 2006/0095350 A1* | 5/2006 | Hall | | G06Q 40/10 |
| | | | | 705/16 |
| 2006/0149671 A1* | 7/2006 | Nix | | G06Q 20/24 |
| | | | | 705/40 |
| 2006/0235796 A1* | 10/2006 | Johnson | | G06Q 20/12 |
| | | | | 705/26.1 |
| 2009/0164328 A1* | 6/2009 | Bishop | | G06Q 20/207 |
| | | | | 705/19 |
| 2010/0205091 A1* | 8/2010 | Graziano | | G06Q 30/02 |
| | | | | 705/40 |
| 2011/0202465 A1* | 8/2011 | Mashhour | | H04L 9/3226 |
| | | | | 705/67 |
| 2011/0208600 A1* | 8/2011 | Aharoni | | G06Q 20/3274 |
| | | | | 705/16 |
| 2012/0317238 A1* | 12/2012 | Beard | | H04L 67/02 |
| | | | | 709/219 |
| 2013/0117185 A1* | 5/2013 | Collison | | G06Q 20/385 |
| | | | | 705/67 |
| 2014/0046786 A1* | 2/2014 | Mazaheri | | G06Q 20/4016 |
| | | | | 705/18 |
| 2014/0249916 A1* | 9/2014 | Verhaeghe | | G06Q 30/0633 |
| | | | | 705/14.51 |
| 2016/0027103 A1* | 1/2016 | Benamour | | G06Q 40/10 |
| | | | | 705/35 |
| 2017/0004475 A1* | 1/2017 | White | | G07G 1/0036 |
| 2017/0011377 A1* | 1/2017 | Stone | | G06Q 40/123 |
| 2017/0083902 A1* | 3/2017 | Gilbey | | G06Q 20/40 |
| 2018/0285868 A1* | 10/2018 | O'Hara | | G06Q 20/34 |
| 2018/0308095 A1* | 10/2018 | Hammad | | G06Q 20/409 |
| 2019/0213569 A1* | 7/2019 | Hosp | | G06Q 20/3226 |
| 2019/0333071 A1* | 10/2019 | Degeneffe | | H04W 4/021 |
| 2020/0042966 A1* | 2/2020 | Deluca | | G06Q 20/3224 |
| 2020/0383081 A1* | 12/2020 | Edwards | | G06Q 30/02 |
| 2023/0297996 A1* | 9/2023 | Spender | | G06Q 20/4014 |
| | | | | 705/41 |

* cited by examiner

FIG. 8A

ITEM SUBTOTAL: $203.99
SHIP TO: 94110 – SAN FRANCISCO ⌄
TAX: $17.34
TOTAL: $221.33

🔒 PROCEED TO CHECKOUT

ITEM SUBTOTAL: $203.99
SHIP TO: 48103 – ANN ARBOR ⌄
ZIP CODE: 48103   UPDATE
TAX: $12.24
TOTAL: $216.23

🔒 PROCEED TO CHECKOUT 800
804

LOCATION-BASED DETERMINATIONS

CROSS-REFERENCE TO RELATED APPLICATIONS

This application claims the benefit of priority as a continuation to U.S. application Ser. No. 17/181,494, filed Feb. 22, 2021, the entirety of which is incorporated by reference herein.

FIELD

The subject matter disclosed herein generally relates to the technical field of special-purpose machines that determine the location of a user's device. Once the user's device's location is determined, determinations that are location-dependent can be made.

BACKGROUND

The present subject matter seeks to address technical problems existing in making determinations based on a user's location. For example, an IP address of a user's device may indicate a location of an internet service provider's or mobile carrier's gateway and not the location of the user device. Accordingly, a location-dependent determination may be inaccurate due to the inaccuracy in determined location.

BRIEF DESCRIPTION OF THE SEVERAL VIEWS OF THE DRAWINGS

Some embodiments are illustrated by way of example and not limitation in the views of the accompanying drawing:

FIG. 8A and FIG. 8B illustrate a graphical user interface in accordance with some embodiments.

DETAILED DESCRIPTION

Figure 1:
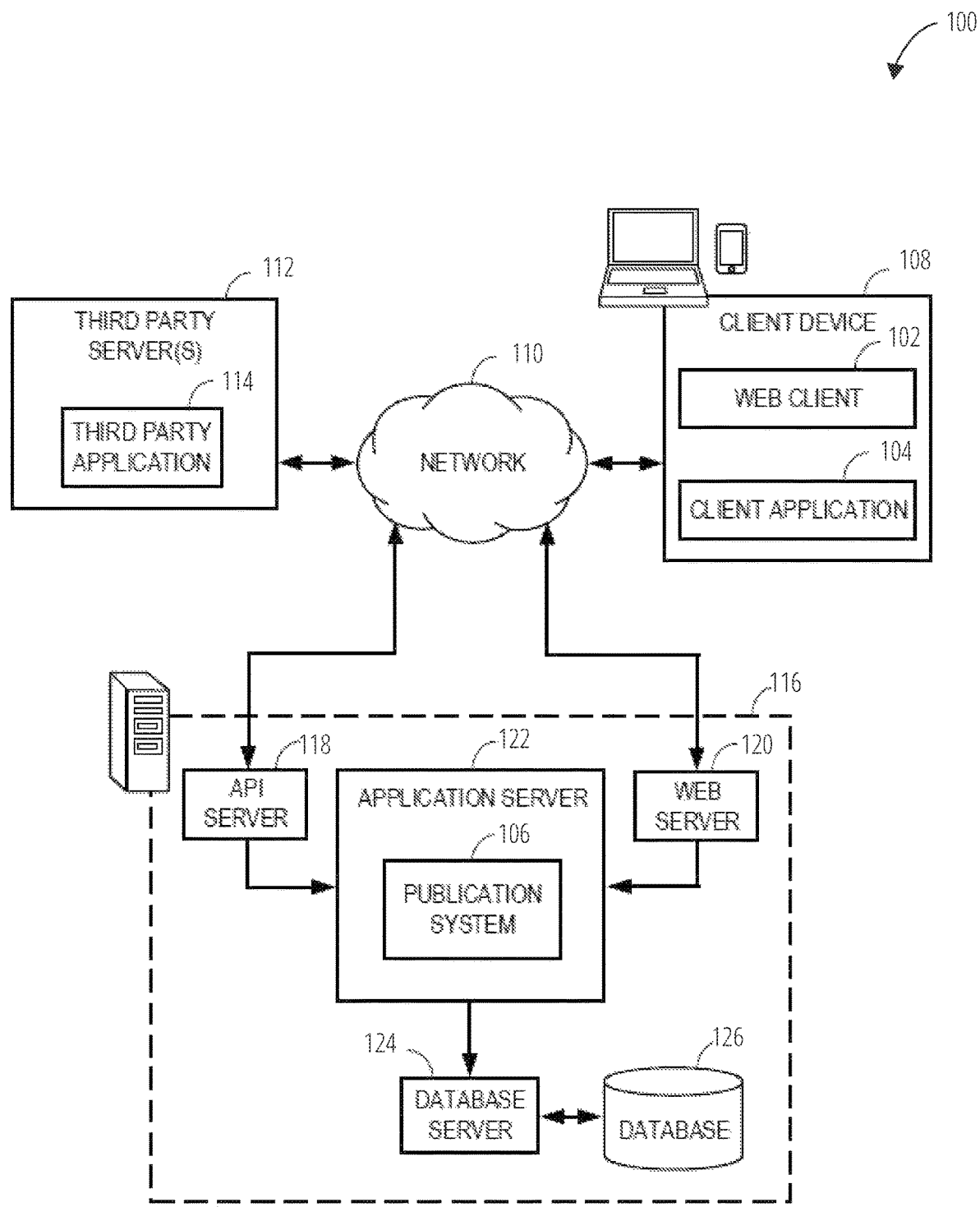
FIG. 1 is a block diagram illustrating a networked system, according to some example embodiments.

"Carrier Signal", in this context, refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device"" or "Electronic Device", in this context, refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's Electronic Device" or "Electronic User Device", in this context, refers to a client device that a customer uses to interact with a merchant. Examples of this device include a desktop computer, a laptop computer, a mobile device (e.g., smartphone, tablet), and a game console. The customer's electronic device may interact with the merchant via a browser application that executes on the customer's electronic device or via a native app installed onto the customer's electronic device. The client-side application executes on the customer's electronic device.

"Communications Network", in this context, refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component", in this context, refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor", in one context, refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor may further be a multi-core processor having two or more independent processors (sometimes referred to as "cores") that may execute instructions contemporaneously.

In another context, a "Processor" (e.g., processor 514 in FIG. 5) is a company (often a third party) appointed to handle payment card (e.g., credit card, debit card) transactions. They have connections to various card networks and supply authorization and settlement services to merchants or payment service providers. In aspects, they can also move the money from an issuing bank to a merchant or acquiring bank.

"Card Network" (or "Card Association"), in this context, refers to financial payment networks such as Visa®, MasterCard®, American Express®, Diners Club®, JCB®, and China Union-Pay®.

"Acquiring Bank" or "Acquirer", in this context, refers to a bank or financial institution that accepts credit and/or debit card payments from affiliated card networks for products or services on behalf of a merchant or payment service provider.

"Card Issuing Bank" or "Issuing Bank", in this context, refers to a bank that offers card network or association—branded payment cards directly to consumers. An issuing bank assumes primary liability for the consumer's capacity to pay off debts they incur with their card.

"Payment Information" includes information required to complete a transaction, and the specific type of information provided may vary by payment type. Some payment information will be sensitive (e.g., the card validation code), while other information might not be (e.g., zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Sensitive information" may not necessarily be related to payment information and may include other confidential personal information, such as medical (e.g., HIPAA) information, for example. The ambit of the term "Payment Information" includes "Sensitive Information" within its scope. In some examples, sensitive payment information may include "regulated payment information," which may change over time. For example, currently a merchant cannot collect more than the first six (6) or the last four (4) numbers of a customer's PAN without generally needing to comply with Payment Card Industry (PCI) regulations. But card number lengths may change, and when they do, the "6 and 4" rules will likely change with them. These potential future changes are incorporated within the ambit of "regulated payment information," which is, in turn, included within the ambit of the term "payment information" as defined herein.

"Merchant", in this context, refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site", in this context, refers to an e-commerce site or portal (e.g., website, or mobile app) of the merchant. In some figures, the merchant (e.g., a merchant 502 of FIG. 5) and merchant servers (e.g., merchant servers 506 of FIG. 5) are associated with the merchant site. The merchant site is associated with a client-side application and a server-side application. In one example embodiment, the merchant site includes the merchant servers 506 of FIG. 5, and the server-side application executes on the merchant servers 506.

"Payment Processor", in this context, (e.g., a payment processor 510 in FIG. 5) refers to an entity or a plurality of entities that facilitate a transaction, for example between a merchant and a customer's electronic device. With reference to a high-level description illustrated in FIG. 5, in some examples described more fully below, the payment processor includes selected functionality of both the payment processor 510 and processor 514/card networks 516. For example, the payment processor 510 creates tokens and maintains and verifies publishable (non-secret) keys and secret keys. In the illustrated example, the processor 514/card networks 516 are involved in authorizing or validating payment information. In one example embodiment, the payment processor 510 and the processor 514/card networks 516 function together to authorize and validate payment information, issue a token, and settle any charges that are made. Accordingly, in this embodiment, "payment processor" refers to the functionality of the payment processor 510 and the functionality of the processor 514/card networks 516. In another example embodiment, wherein step (3) in the high-level description is not performed, and the payment processor 510 performs its own verification before issuing a token, the processor 514/card networks 516 are still used for settling any charges that are made, as described in step (7). Accordingly, in this embodiment, "payment processor" may refer only to the functionality of the payment processor 510 with respect to issuing tokens. Further, in the example arrangement shown, the payment processor 510, the processor 514, and the card networks 516 are shown as separate entities. In some examples, their respective functions may be performed by two entities, or even just one entity, with the entities themselves being configured accordingly.

"Native Application" or "native app", in this context, refers to an app commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which requires interpreter software. A native application also differs from an emulated application that is written for a different platform and converted in real time to run, and a web application that is run within the browser.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. In this specification, the terms "user", "cardholder", and "consumer" are used interchangeably unless the context indicates otherwise.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, CA (herein "Stripe") as an example of a payment processor 510) that provides a number of functions and services to the client application 104 that accesses the networked system 116. The client application 104 also provides a number of interfaces described herein, which present output of push payment decision routing to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the programmatic client application 104 and the networked system 116.

Further, while the SaaS network architecture 100 shown in FIG. 1 employs a client-server architecture, the present inventive subject matter is, of course, not limited to such an architecture, and could equally well find application in a distributed, or peer-to-peer, architecture system, for example. The publication system 106 could also be implemented as a standalone software program, which does not necessarily have networking capabilities.

Figure 2:
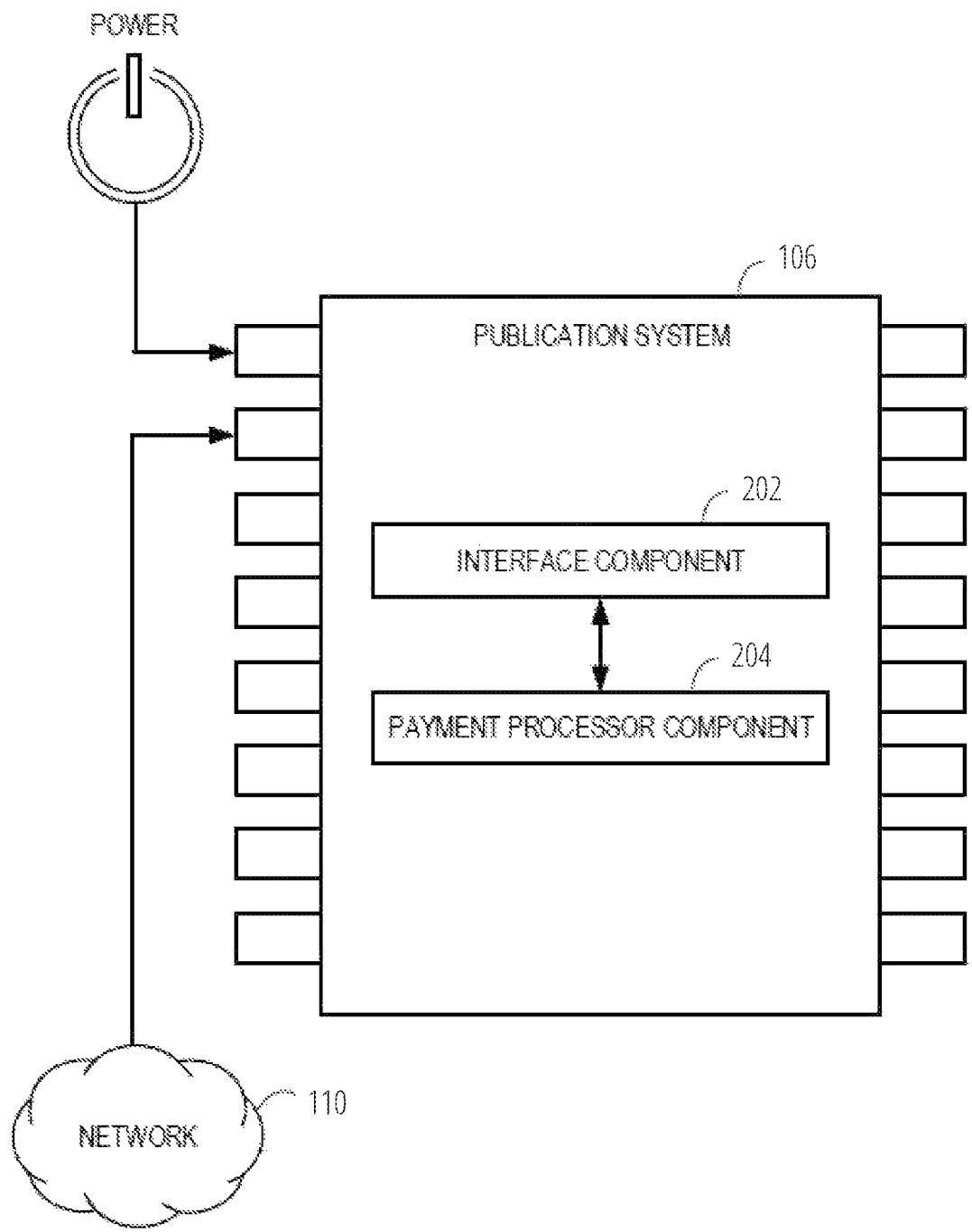
FIG. 2 is a block diagram showing architectural aspects of a publication system, according to some example embodiments.

FIG. 2 is a block diagram showing architectural details of a publication system 106, according to some example embodiments. Specifically, the publication system 106 is shown to include an interface component 202 by which the publication system 106 communicates (e.g., over a network 110) with other systems within the SaaS network architecture 100.

The interface component 202 is communicatively coupled to a payment processor component 204 that operates to provide push payment decision routing for a payment processor 510 in accordance with the methods described herein with reference to the accompanying drawings.

Figure 3:
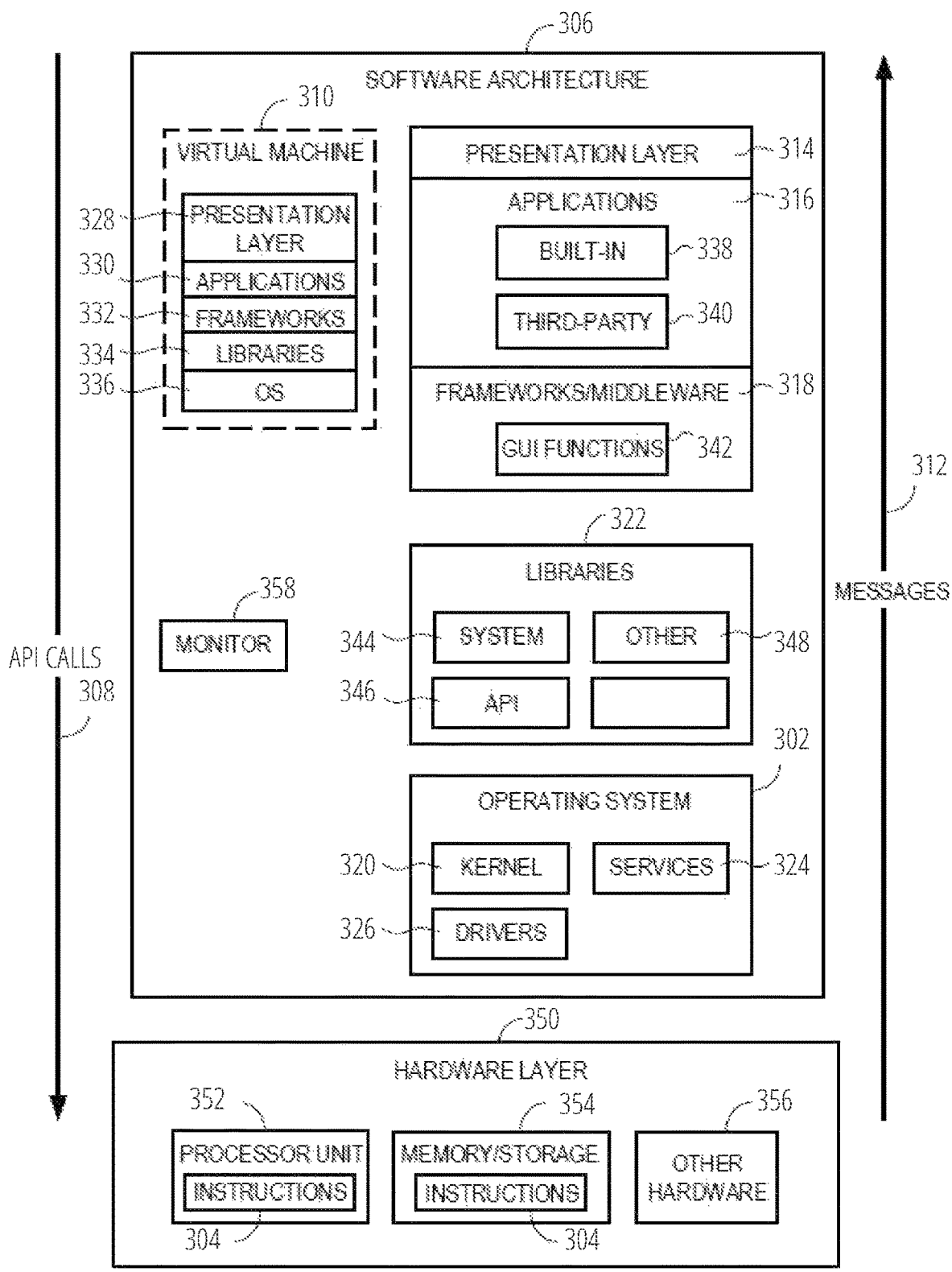
FIG. 3 is a block diagram illustrating a representative software architecture, which may be used in conjunction with various hardware architectures herein described

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 350 is illustrated and can represent, for example, the machine 400 of FIG. 4. The representative hardware layer 350 includes a processor 352 having associated executable instructions 304. The executable instructions 304 represent the executable instructions of the software architecture 306, including implementation of the methods, components, and so forth described herein. The hardware layer 350 also includes memory and/or storage modules as memory/storage 354, which also have the executable instructions 304. The hardware layer 350 may also comprise other hardware 356.

In the example architecture of FIG. 3, the software architecture 306 may be conceptualized as a stack of layers where each layer provides particular functionality. For example, the software architecture 306 may include layers such as an operating system 302, libraries 322, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 320, services 324, and drivers 326. The kernel 320 may act as an abstraction layer between the hardware and the other software layers. For example, the kernel 320 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 322 provide a common infrastructure that is used by the applications 316 and/or other components and/or layers. The libraries 322 provide functionality that allows other software components to perform tasks in an easier fashion than by interfacing directly with the underlying operating system 302 functionality (e.g., kernel 320, services 324, and/or drivers 326). The libraries 322 may include system libraries 344 (e.g., C standard library) that may provide functions such as memory allocation functions, string manipulation functions, mathematical functions, and the like. In addition, the libraries 322 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 322 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system 302 or platform.

The applications 316 include built in applications 338 and/or third-party applications 340. Examples of representative built in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 320, services 324, and/or drivers 326), libraries 322, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 358, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
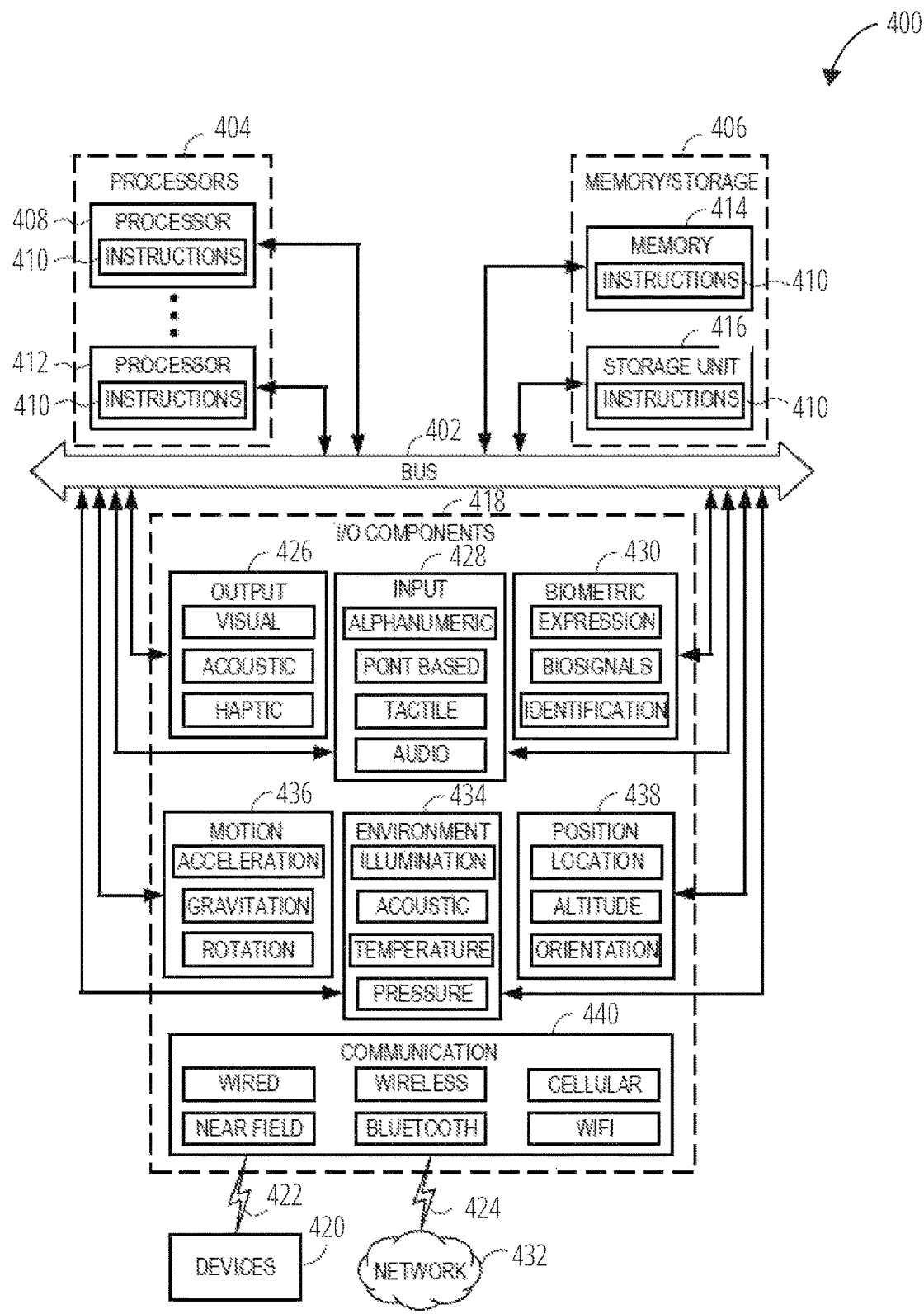
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions 304 from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processor 408 and processor 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine 400 will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 436, environment components 434, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 436 may include acceleration sensor components (e.g., accelerometer), gravitation sensor components, rotation sensor components (e.g., gyroscope), and so forth. The environment components 434 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

In some embodiments, a JavaScript library can be embedded into a merchant 502's checkout form to handle credit card information. When a user attempts to complete a transaction using the checkout form, it sends the credit card information directly from the user's browser to the payment processor 510's servers. The JavaScript library provides merchants 502 with a set of technologies that can be easily and quickly integrated to securely accept payments online. With the JavaScript library, merchants 502 retain full control of their customers' payment flows, but their servers are never exposed to sensitive payment information.

When added to a merchant's payment form, the JavaScript library automatically intercepts the payment form submission, sending payment information directly to the payment processor 524 and converting it to a single-use token. The single-use token can be safely passed to the merchant's systems and used later to charge customers. Merchants 502 have complete control of their customers' payment experience without ever handling, processing, or storing sensitive payment information.

Figure 5:
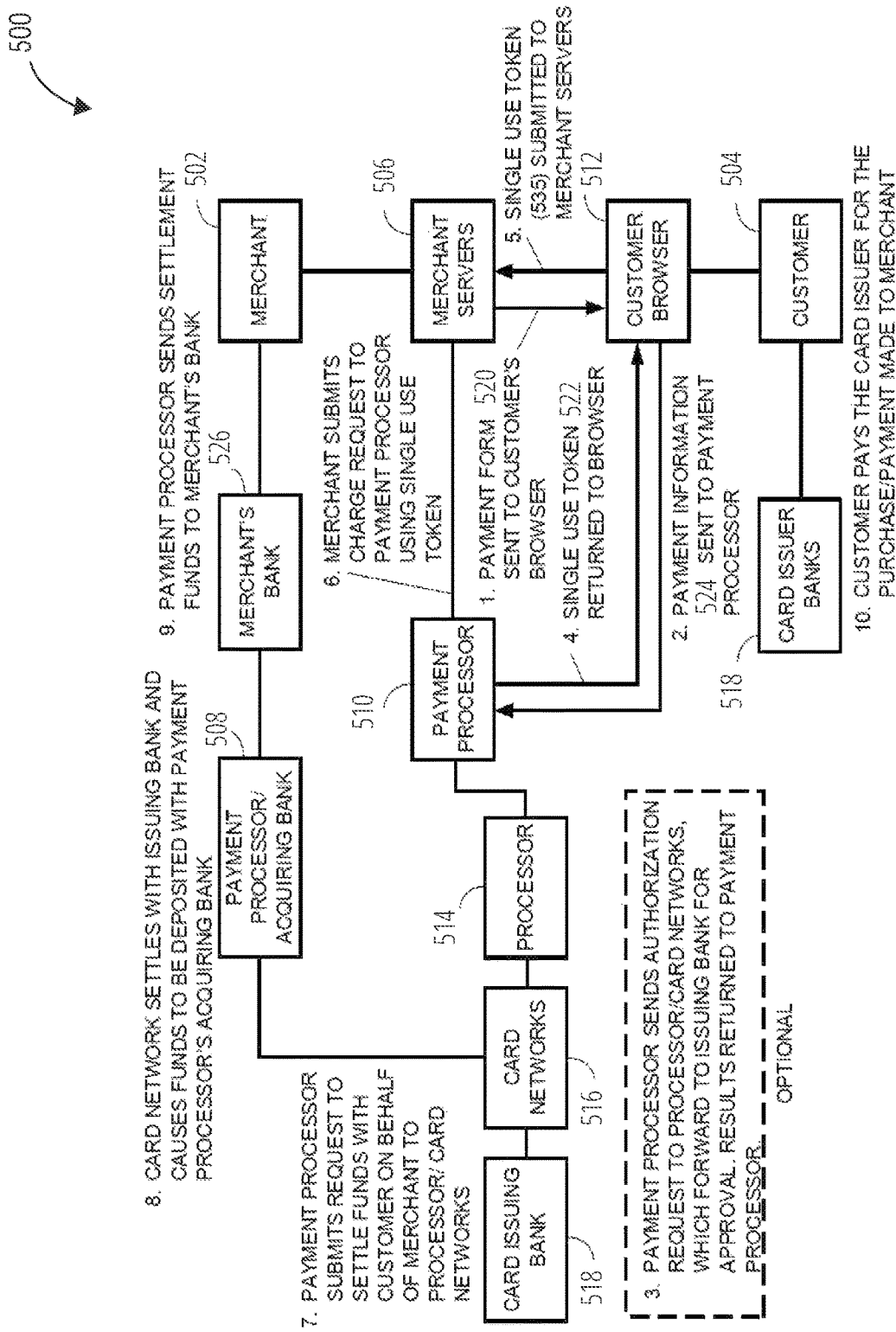
FIG. 5 is a block diagram showing aspects of an online method for conducting a transaction between a merchant site and an electronic user device using a payment processor, according to some example embodiments.

Viewed generally in one example, and with reference to FIG. 5, a payment processing flow is now described:

The merchant's customer 504 uses an Internet-enabled browser 512 to visit the merchant's site. The customer 504 is served a JavaScript library-enabled payment form 520 using standard web technologies. The customer 504 enters the specified information including their payment information 524 and submits the payment form 520. The billing info portion of the payment form 520 is for payment via a credit card or debit card. If payment is to be made via an ACH transaction, the billing info portion of the payment form 520 will request a bank routing number and an account number within that bank, and possibly additional information, such as the bank name and whether the account is a checking or savings account.

The customer's payment information 524 is sent from the customer's browser 512 to the payment processor 510, never touching the merchant servers 506. In this manner, the client-side application electronically sends payment information 524 retrieved from the customer's electronic device to the payment processor 510. The client-side application does not send the payment information 524 to the server-side application.

In one preferred embodiment, the payment processor 510 submits the relevant transaction to a processor 514 or directly to the card network 516 for authorization or validation of the payment information 524. The card network 516 sends the request to the card issuing bank 518, which authorizes the transaction. In this embodiment, the payment processor 510 and the processor 514/card network 516 function together as a payment processor 510. In another example embodiment, this step is performed without any communication to the processor 514/card network 516. Instead, the payment processor 510 performs its own authorization or validation of the payment information 524 using heuristic means, such as by checking the bank identification number (BIN), also referred to as the issuer identification number (IIN), against a database 126 of known, valid BINs on file with the payment processor 510. (The BIN is a part of the bank card number, namely the first six digits.) In yet another example embodiment, this step is not performed at all since the authorization or validation is not necessary for the next step (4) to succeed. That is, it is acceptable to create a single-use token in step (4) that represents payment information 524 which has not been validated in any way.

If authorized, the payment processor 510 will generate and return a secure, single-use token 522 to the customer's browser 512 that represents the customer's payment information 524 but does not leak any sensitive information. In the example embodiment wherein step (3) is not performed, the payment processor 510 performs this step without waiting to receive authorization from the processor 514 or the card network 516. In this manner, the payment processor 510 creates the token 522 from the payment information 524 sent by the client-side application, wherein the token 522 functions as a proxy for the payment information 524.

The payment form 520 is submitted to the merchant servers 506, including the single-use token 522. More specifically, the payment processor 510 sends the token 522 to the client-side application, which, in turn, sends the token 522 to the server-side application for use by the server-side application in conducting the transaction.

The merchant 502 uses the single-use token 522 to submit a charge request to the payment processor 510 (or to create a customer object for later use). In this step, the payment processor 510 submits a request to authorize the charge to the processor 514 or directly to the card network 516. This authorization specifies the actual amount to charge the credit card. If an authorization was already done in step (3) for the correct amount, this authorization request can be skipped. This may be a one-time payment for a merchant item, or it may involve registering the payment information 524 with the merchant site for subsequent use in making a payment for a merchant item (a so-called "card on file" scenario). Using the process described in steps (1) through (6), the payment information 524 can be used by the server-side application via the token 522 without the server-side application being exposed to the payment information 524.

The payment processor 510 settles the charge on behalf of the merchant 502 with the processor 514 or directly with the card network 516.

The card network 516 causes the funds to be paid by the card issuing bank 518 to the payment processor 510 or to the payment processor's acquiring bank 508.

The payment processor 510 causes the settled funds to be sent to the merchant 502 (or to the merchant's bank 526), net of any applicable fees.

The card issuing bank 518 collects the paid funds from the customer 504.

Not all of the steps listed above need happen in real time. Other examples, arrangements, and functionality are possible. Applicant's published patent application US 2013/0117185 A1 is incorporated by reference in its entirety in this regard. Typically, when the merchant's customer 504 submits the payment form 520 in step (1), steps (1) through (6) happen in real time and steps (7) through (10) happen later, usually once per day, as a batch process settling all of the funds for all of the payment processor 510's merchants 502. In some examples, the payment processor 510 uses an HTTP-based tokenization API in steps (2) and (4) above. Some broader examples may be considered as "tokenization as a service," in which any data is tokenized. One general example may facilitate a merger and acquisition (M&A) analysis in which companies want to compare an overlap in their customer bases. A payment processor 510 (acting as a tokenization service) can tokenize the customers 504 of each company and compare the overlap without revealing confidential information to either party. Unique payment tokens can be adapted to enable and facilitate such a tokenization service.

The As mentioned above, factors that can present technical challenges include resolving the location of a user's electronic device so that a location-dependent calculation or determination can be performed with accurate location data.

Thus, in some embodiments, a system is provided for resolving the location of user's electronic device and then performing a location-dependent calculation. An example system may comprise a network; one or more hardware processors; and a memory storing instructions that, when executed by at least one processor among the processors, cause the system to perform operations comprising, at least: determining a geographic location of a user's electronic device using first data; in response to determining the determined geographic location is insufficient for performing a location-dependent calculation, requesting second data to determine an updated geographic location of the user's electronic device; performing, with an API, the location-dependent calculation based on the updated geographic location; and completing, with the API, a transaction using the location-dependent calculation.

Figure 6:
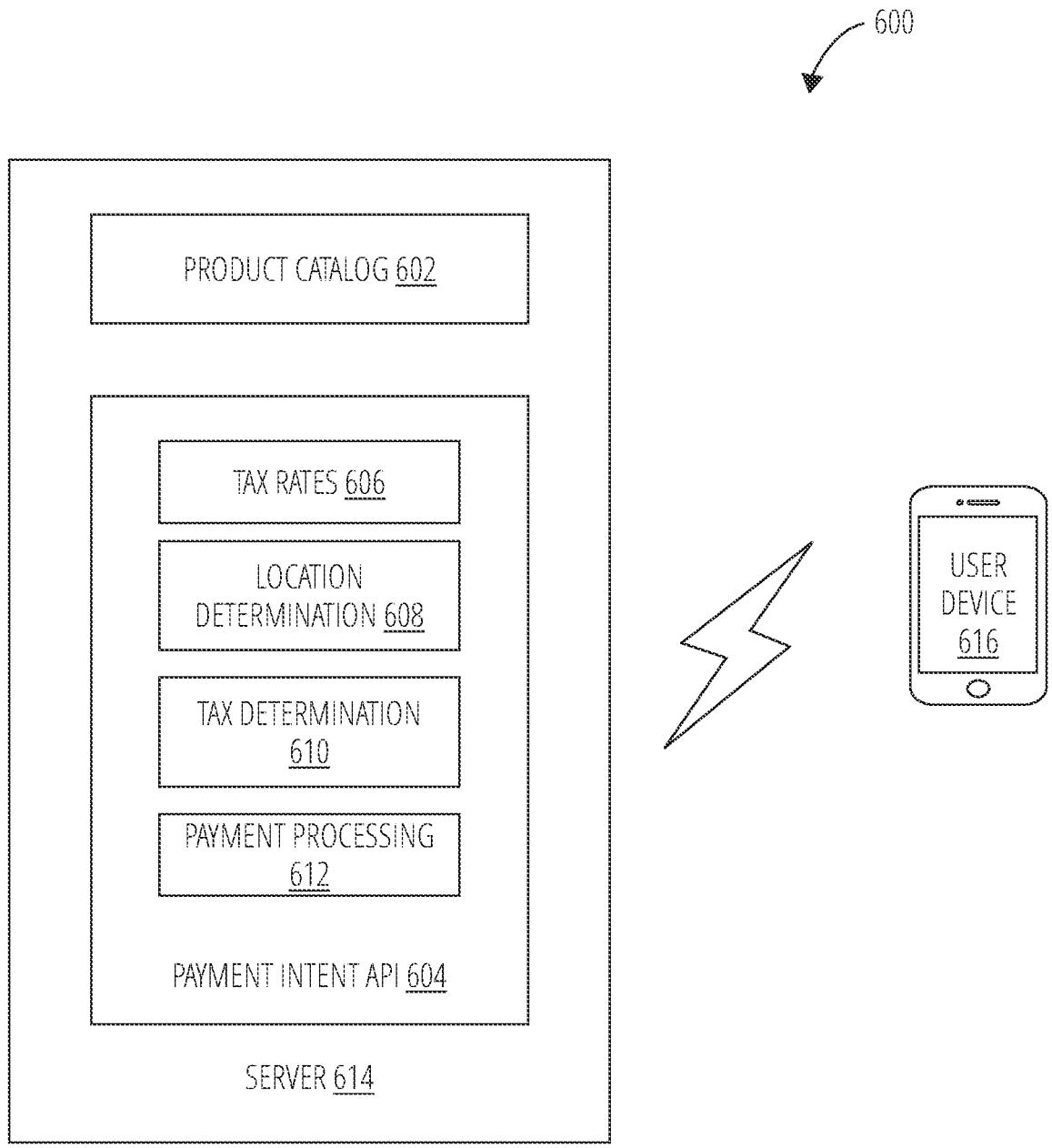
FIG. 6 is a block diagram illustrating a system, according to some example embodiments.

FIG. 6 illustrates a system 600 in accordance with one embodiment. The system 600 includes a server 614 having a Product Catalog 602 for a merchant, such as merchant 502, and a Payment Intent API 604. The Product Catalog 602 includes products a merchant sells (available for purchase). These products will be attached to individual transaction line items in a customer basket at a user device 616, which is communicatively coupled to the server 614, to inform Payment Intent API 604 of how to treat them for tax purposes. Some product types have reduced tax rates, such as ebooks in most of Europe. Products with no tax code use a default from merchant settings—either fully taxable or not taxable. Example tax codes to apply to products include:

| TAX CODE | DESCRIPTION |
| --- | --- |
| DM201010 | Digital Media > ebooks > Less Than Permanent Use Rights Digital Goods & Services |
| DM201020 | Digital Media > ebooks > Permanent Use Rights Digital Goods & Services |

-continued

| TAX CODE | DESCRIPTION |
|---|---|
| DM201030 | Digital Media > ebooks > Education & Reference Digital Goods & Services |

The Payment Intent API 604 comprises Tax Rates 606, Location Determination 608, Tax Determination 610 and Payment Processing 612. In an embodiment, the system 600 can include the payment processor 510. The Payment Intent API 604 creates an object that represents a merchant's intent to collect payment from a user of the user device 616 and tracks the lifecycle of the payment process through each stage.

As will be described in further detail below, the Location Determination 608 determines a location of the user device 616. The Tax Determination 610 performs a location dependent calculation, such as calculating sales tax using the determined location and applying Tax Rates 606 to a product in the Product Catalog 602 based on tax code and/or location. The Payment Processing 612 then completes a transaction for the taxed product as discussed in conjunction with FIG. 5 or other methods. For example, displaying the final (tax) calculation on the user device 616 and accepting payment input from the user device 616. Accordingly, both tax calculation and payment can be performed with a call to a single API instead of to multiple APIs to speed calculation and reduce communication traffic in the server 614 due to multiple API calls.

The Payment Intent API 604 supports both tax inclusive (expected taxes built into pricing) and tax exclusive (taxes added after pricing) rates. While tax-inclusive merchants must still collect information about their end customer's location in order to accurately calculate rates, this information won't change the total amount that their customer pays, so merchants can provide tax later in a payment flow. Conversely, tax-exclusive merchants must collect information about their customer's location earlier in the flow so that the Payment Processing 612 can accurately calculate tax rates for the merchant to display to their end customer before the customer confirms the payment.

In an example, the Payment Intent API 604 can include a TaxRate object having the following fields:

| Field | Meaning |
|---|---|
| inclusive | Whether this tax is included in the subtotal price or not. Determined by the tax_behavior of the price object on each line item. |
| jurisdiction | Outside the US: The country charging the tax In the US/Canada: The state/province charging the tax |
| percent | The base percentage of the tax. This percentage may not correspond perfectly to the percentage charged, due to local tax rules. |
| display_name | A local display name for this tax. For certain taxes, this may be the legally mandated display name (for example French VAT taxes wil lappear "TVA"). For other taxes, this is a user-localized version of the tax name (e.g., a sales may appear as a "taxe de vente" to a French speaker). |
| tax_type | The type of the tax. |
| country | The country charging the tax |
| state | In the US/Canada: The state/province charging the tax Outside the US: Not present |

The Location Determination 608 determines location initially, in an example, by determining a location associated with an IP address of the user device 616. This allows for estimating taxes with no customer friction (requiring no manual input from the customer). This can be passed to Payment Intent object at creation or by updating the Payment Intent object. However, IP addresses will not always provide enough information to perform a location dependent calculation, such as estimate taxes, so the Location Determination 608 may request a user's country, Postal Code or full address instead of or in addition. For example, an initial location determination (e.g., IP address or via other methods) may yield an area having different tax rates and therefore require a location determination with higher resolution to determine accurate tax. For example, a postal code for initial location determination can yield several towns each with their own tax rate. An IP address may be insufficient because if it yields a location of a controlling agency that the user device 616 is connected to and not the true location of the user device 616. For example, if the user device 616 is in the northern US, the IP address may show Canada, thereby requiring further resolution of the location of the user device 616. Accordingly, an IP address indicated a physical location at a border region will require further resolution by the Location Determination 608.

In an example, in order to show taxes on a cart before a customer enters their payment information, the merchant may collect a subset of the billing address before collecting the Payment Method. To do this, the Location Determination 608 will prompt the user for billing information. FIG. 8A and FIG. 8B show the transition from an IP address location determination at 802 to a user-entered billing address at 804 in a GUI 800.

In order to maintain clarity that this address is lower priority than the actual billing address and also not the correct place for collecting a full billing address when collecting payment information, the tax billing address allows for less detail than a full address. The Location Determination 608 will ask for a country, postal code and/or state/province in the tax billing address.

Alternatively to using the IP address (e.g., if the IP address is insufficient for the location dependent calculation), the Location Determination 608 can request that the user device 616 send current location as determined by a global positioning system (e.g., GPS, GLONASS, etc.) reading by, for example, sending a request to the user device 616 to call a geolocation API and report back the result. In another example, the Location Determination 608 can determine current location based on a recent photograph. For example, the Location Determination 608 can find a recent photograph of the Eiffel Tower in memory of the user device 616, search for that image in a database of images (on the server 614 or elsewhere) with correlated locations and determine that the device is in Paris, France. In an example, a user may wish to enter an address different from the location of the user device 616 (e.g., a shipping address different from a location of the user device 616).

If the tax amount on a payment changes (e.g., user changes tax location or the Location Determination 608 resolves location to be different than an initially determined location), the Payment Intent API 604 may need to reconfirm the payment by displaying the updated calculation on the user device 616 and asking the user to confirm again. When reconfirming a payment, the Payment Intent API 604 may allow the user to change the Payment Method and billing address, in which case the tax amount may change again, requiring further reconfirmation.

In another example, the Payment Intent API 604 can be employed to provide access to a computer network based on resolved location. For example, the Location Determination 608 determines location and the Payment Processing 612 would grant access (authorization session) based on the location (e.g., access if in the US and no access if in a foreign country; access if at a specific building, limited access otherwise; authorized session for a specific amount of time based on location, etc.). In another example, the Payment Intent API 604 can be employed to complete a transaction that transfers fungible goods such as electricity or oil. For example, electricity could be provided to a building in which the user device 616 is located.

Figure 7:
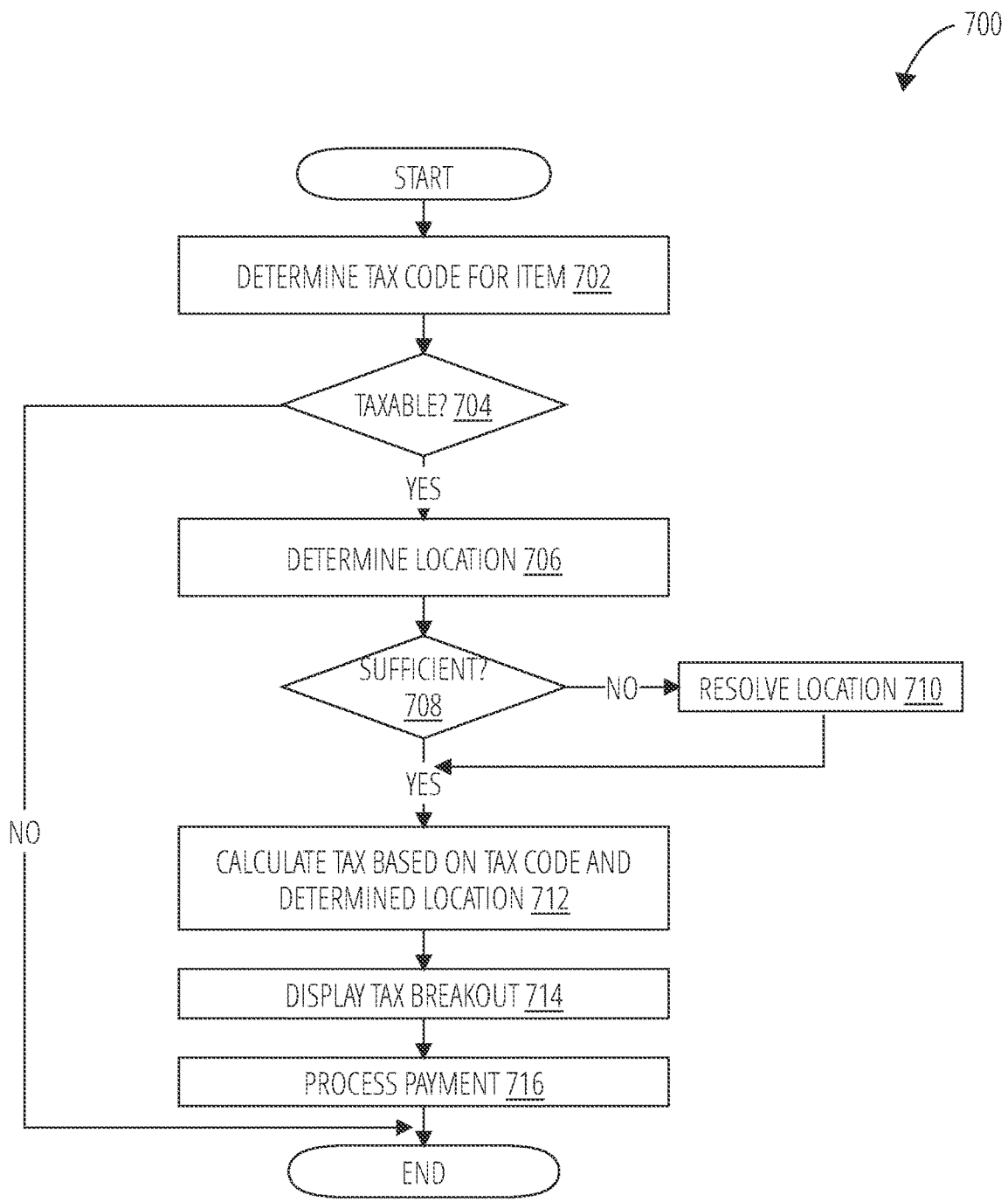
FIG. 7 is a flow chart illustrating a method in accordance, according to some example embodiments.

FIG. 7 illustrates a method 700 in accordance with one embodiment. After a user of a mobile device has selected an item for purchase, the method 700 determines (702) the tax code for the item based on an entry in the Product Catalog 602. If (704) the item is not taxable the method 700 ends. Otherwise, the location is determined (706) via a first method as discussed above. For example, it initially may be via IP address of the user device 616. If (708) the determined location is insufficient to perform a location-dependent calculation (e.g., sales tax calculation) or determination (e.g., network access), the location is resolved (710) by using a second method to determine location as discussed above. This may include, for example, requesting a user of the device to enter a location or requesting the user's device to send its location based on a read of a GPS device embedded within the user device. Next, a calculation/determination is performed (712) based on the location. For example, a sales tax calculation can be calculated based on location and tax code indicating how the item should be taxed. Further, for example, the determination could be to grant access to a network based on location. Alternatively, for example, the item could include electricity and the determining based on location could determine if the location can receive electricity and/or what type of electricity (e.g., solar, wind, conventional, etc.). Next, a tax breakout is displayed (714) and the transaction completed (716), which can include processing payment for the item, transmitting electricity, granting access to a network, etc.

Examples include:

1. A method for location-dependent determination, comprising:
   determining, with one or more processors, a geographic location of a user's electronic device using first data;
   in response to determining the determined geographic location is insufficient for performing a location-dependent determination, requesting second data to determine an updated geographic location of the user's electronic device;
   performing, with an Application Programming Interface (API), the location-dependent determination based on the updated geographic location; and
   completing, with the API, a transaction using the location-dependent determination.

2. The method of example 1, wherein the first data is an Internet Protocol (IP) address of the user's electronic device and the second data is a postal code entered by a user into the electronic device.

3. The method of any of the preceding examples, wherein the requesting requests the electronic device's location based on a global positioning system reading.

4. The method of any of the preceding examples, wherein the requesting requests the user to enter a shipping postal code.

5. The method of any of the preceding examples, wherein the performing the location-dependent determination is further based on a tax code of an item to be purchased in the transaction.

6. The method of any of the preceding examples, further comprising generating a product catalog including tax codes for items available for purchase.

7. The method of any of the preceding examples, wherein the transaction includes a purchase of an item and the location-dependent determination includes tax associated with the purchase.

8. The method of any of the preceding examples, wherein the location-dependent determination includes calculating an authorization session to access a computer network and the completing includes granting access to the electronic device to access the computer network for the session.

9. The method of any of the preceding examples, wherein the location-dependent determination includes calculating a type of electricity to transmit to a location of the user's electronic device and the completing includes transmitting the electricity to the determined location.

10. A non-transitory machine-readable medium comprising instructions which, when read by a machine, cause the machine to perform operations, the operations comprising, at least:
   determining a geographic location of a user's electronic device using first data;
   in response to determining the determined geographic location is insufficient for performing a location-dependent determination, requesting second data to determine an updated geographic location of the user's electronic device;
   performing, with an Application Programming Interface (API), the location-dependent determination based on the updated geographic location; and
   completing, with the API, a transaction using the location-dependent determination.

11. A computing apparatus for location-dependent determinations, the computing apparatus comprising:
   one or more hardware processors; and
   a memory storing instructions that, when executed by at least one processor among the processors, cause the system to perform operations comprising, at least:
   determining a geographic location of a user's electronic device using first data;
   in response to determining the determined geographic location is insufficient for performing a location-dependent determination, requesting second data to determine an updated geographic location of the user's electronic device;
   performing, with an Application Programming Interface (API), the location-dependent determination based on the updated geographic location; and
   completing, with the API, a transaction using the location-dependent determination.

12. The computing apparatus of any of the preceding examples, wherein the first data is an Internet Protocol (IP) address of the user's electronic device and the second data is a postal code entered by a user into the electronic device.

13. The computing apparatus of any of the preceding examples, wherein the requesting requests the electronic device's location based on a global positioning system reading.

14. The computing apparatus of any of the preceding examples, wherein the requesting requests the user to enter a shipping postal code.

15. The computing apparatus of any of the preceding examples, wherein the performing the location-dependent determination is further based on a tax code of an item to be purchased in the transaction.

16. The computing apparatus of any of the preceding examples, wherein the instructions further configure the apparatus to generate a product catalog including tax codes for items available for purchase.

17. The computing apparatus of any of the preceding examples, wherein the transaction includes the purchase of an item and the location-dependent determination includes tax.

18. The computing apparatus of any of the preceding examples, wherein the location-dependent determination includes calculate an authorization session to access a computer network and the completing includes granting access to the electronic device to access the computer network for the session.

19. The computing apparatus of any of the preceding examples, wherein the location-dependent determination includes calculating an amount of time for the authorization session.

20. The computing apparatus of any of the preceding examples, wherein the location-dependent determination includes calculate a type of electricity to transmit to a location of the user's electronic device and the completing includes transmitting the electricity to the determined location.

Although the subject matter has been described with reference to specific example embodiments, it will be evident that various modifications and changes may be made to these embodiments without departing from the broader scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for processing transactions between merchant websites and computing devices, the merchant websites associated with client-side applications and server-side applications, the method comprising:
   receiving, by one or more processors, payment information for each of a plurality of users from a plurality of client-side applications associated with the plurality of users, wherein the plurality of client-side applications do not send the payment information to any server-side applications when performing transactions;
   generating, by the one or more processors, a token for each of the plurality of users from the payment information sent by the plurality of client-side applications, each token functioning as a proxy for the payment information from which the token was generated;
   transmitting, by the one or more processors, the tokens to the plurality of client-side applications,
      wherein each of the plurality of client-side applications is configured to transmit a token transmitted to the client-side application to a server-side application of one or more server-side applications for use by the server-side application in conducting a transaction through the one or more processors;
   comparing, by the one or more processors, a first set of tokens generated from payment information of a first subset of the plurality of users for a first entity with a second set of tokens generated from payment information of a second subset of the plurality of users for a second entity; and
   responsive to identifying at least one matching token between the first set of tokens and the second set of tokens, generating, by the one or more processors, a record comprising a list of matching tokens that are included in each of the first set of tokens and the second set of tokens and represent a third subset of the plurality of users that are common to the first entity and second entity.

2. The method of claim 1, wherein generating the token for each of the plurality of users from the payment information sent by the plurality of client-side applications comprises generating, by the one or more processors, the token using a Hypertext Transfer Protocol (HTTP)-based tokenization application programming interface.

3. The method of claim 1, comprising:
   receiving, by the one or more processors, a first token from a first server-side application of the one or more server-side applications; and
   settling, by the one or more processors, a first transaction based on the first token.

4. The method of claim 1, wherein a first client-side application of the plurality of client-side applications transmits a first token to a first server-side application of the one or more server-side applications to complete a first transaction comprising registering payment information of the first token with a first merchant website for subsequent use in making a payment for a merchant item.

5. The method of claim 1, wherein a first client-side application of the plurality of client-side applications executes within a browser executing on a computing device.

6. The method of claim 1, further comprising:
determining, by the one or more processors, a geographic location of a first user's electronic device using first data, the first user's electronic device executing a first client-side application to complete a first transaction;
performing, by the one or more processors via an Application Programming Interface (API), a location-dependent determination based on the geographic location; and
completing, by the one or more processors via the API, the first transaction using the location-dependent determination based on a first token generated by the one or more processors from payment information of the first user.

7. The method of claim 1, further comprising:
enforcing, by the one or more processors, a rule that prevents a previously used token from being used for another transaction.

8. The method of claim 1, comprising:
authorizing, by the one or more processors, a first transaction,
wherein generating a first token for a first user of the plurality of users comprises generating, by the one or more processors, the first token responsive to authorizing the first transaction.

9. The method of claim 8, wherein authorizing the first transaction comprises:
transmitting, by the one or more processors, data of the first transaction to a first remote computing device; and
receiving, by the one or more processors, authorization for the first transaction from the first remote computing device or a second remote computing device.

10. The method of claim 8, wherein authorizing the first transaction comprises:
executing, by the one or more processors, a rule using data of a transaction card of the payment information as input; and
determining, by the one or more processors, the first transaction is authorized based on the executing the rule.

11. A system for processing transactions between merchant websites and computing devices, each merchant website being associated with a client-side application and a server-side application, comprising:
one or more processors coupled with memory and configured to:
receive payment information for each of a plurality of users from a plurality of client-side applications associated with the plurality of users, wherein the plurality of client-side applications do not send the payment information to any server-side applications when performing transactions;
generate a token for each of the plurality of users from the payment information sent by the plurality of client-side applications, each token functioning as a proxy for the payment information from which the token was generated;
transmit the tokens to the plurality of client-side applications,
wherein each of the plurality of client-side applications is configured to transmit a token transmitted to the client-side application to a server-side application of one or more server-side applications for use by the server-side application in conducting a transaction through the one or more processors;
compare a first set of tokens generated from payment information of a first subset of the plurality of users for a first entity with a second set of tokens generated from payment information of a second subset of the plurality of users for a second entity; and
responsive to identifying at least one matching token between the first set of tokens and the second set of tokens, generate a record comprising a list of matching tokens that are included in each of the first set of tokens and the second set of tokens and represent a third subset of the plurality of users that are common to the first entity and second entity.

12. The system of claim 11, wherein the one or more processors are configured to generate the token for each of the plurality of users from the payment information sent by the plurality of client-side applications by generating the token using a Hypertext Transfer Protocol (HTTP)-based tokenization application programming interface.

13. The system of claim 11, wherein the one or more processors are further configured to:
receive a first token from a first server-side application of the one or more server-side applications; and
settle a first transaction based on the first token.

14. The system of claim 11, wherein a first client-side application of the plurality of client-side applications transmits a first token to a first server-side application of the one or more server-side applications to complete a first transaction comprising purchasing an item from a first merchant website associated with the first client-side application and the first server-side application.

15. The system of claim 11, wherein a first client-side application of the plurality of client-side applications transmits a first token to a first server-side application of the one or more server-side applications to complete a first transaction comprising registering payment information of the first token with a first merchant website for subsequent use in making a payment for a merchant item.

16. The system of claim 14, wherein the one or more processors are further configured to:
authorize a first transaction,
wherein the one or more processors are further configured to generate a first token for a first user of the plurality of users by generating the first token responsive to authorizing the first transaction.

17. A non-transitory machine-readable medium comprising instructions which, when executed by one or more processors, cause the one or more processors to:
receive payment information for each of a plurality of users from a plurality of client-side applications associated with the plurality of users, wherein the plurality of client-side applications do not send the payment information to any server-side applications when performing transactions;
generate a token for each of the plurality of users from the payment information sent by the plurality of client-side applications, each token functioning as a proxy for the payment information from which the token was generated;
transmit the tokens to the plurality of client-side applications,
wherein each of the plurality of client-side applications is configured to transmit a token transmitted to the client-side application to a server-side application of one or more server-side applications for use by the server-side application in conducting a transaction through the one or more processors;
compare a first set of tokens generated from payment information of a first subset of the plurality of users for a first entity with a second set of tokens generated from payment information of a second subset of the plurality of users for a second entity; and responsive to identifying at least one matching token between the first set of tokens and the second set of tokens, generate a record comprising a list of matching tokens that are included in each of the first set of tokens and the second set of tokens and represent a third subset of the plurality of users that are common to the first entity and second entity.

18. The non-transitory machine-readable medium of claim 17, wherein executing the instructions further causes the one or more processors to:

receive a first token from a first server-side application of the one or more server-side applications; and settle a first transaction based on the first token.

19. The non-transitory machine-readable medium of claim 17, wherein a first client-side application of the plurality of client-side applications transmits a first token to a first server-side application of the one or more server-side applications to complete a first transaction comprising registering payment information of the first token with a first merchant website for subsequent use in making a payment for a merchant item.

20. The non-transitory machine-readable medium of claim 17, wherein executing the instructions further causes the one or more processors to:

authorize a first transaction,
wherein executing the instructions causes the one or more processors to generate a first token for a first user of the plurality of users by generating the first token responsive to authorizing the first transaction.

* * * * *